United States Patent
Guo et al.

(10) Patent No.: US 10,420,136 B2
(45) Date of Patent: Sep. 17, 2019

(54) PREDICTIVE DOWNLINK SCHEDULING

(71) Applicant: Telefonaktiebolaget LM Ericsson (publ), Stockholm (SE)

(72) Inventors: Shiguang Guo, Kanata (CA); Girum Alebachew Fantaye, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/547,818

(22) PCT Filed: Feb. 2, 2015

(86) PCT No.: PCT/IB2015/050795
§ 371 (c)(1),
(2) Date: Aug. 1, 2017

(87) PCT Pub. No.: WO2016/124971
PCT Pub. Date: Aug. 11, 2016

(65) Prior Publication Data
US 2018/0020471 A1    Jan. 18, 2018

(51) Int. Cl.
*H04W 72/04*    (2009.01)
*H04W 72/12*    (2009.01)

(52) U.S. Cl.
CPC ... *H04W 72/1289* (2013.01); *H04W 72/1236* (2013.01); *H04W 72/1252* (2013.01)

(58) Field of Classification Search
CPC ........... H04W 72/121; H04W 72/1289; H04W 72/1236; H04W 72/1252
See application file for complete search history.

(56) References Cited

U.S. PATENT DOCUMENTS 6,195,699 B1 * 2/2001 Dennis .................. G06F 9/4887
                                                         370/238
2003/0007466 A1 * 1/2003 Chen .................. H04W 72/1257
                                                         370/328
(Continued)

FOREIGN PATENT DOCUMENTS

EP      2200390 A2    6/2010
EP      2427015 A1    3/2012
(Continued)

*Primary Examiner* — Hassan Kizou
*Assistant Examiner* — Mahbubul Bar Chowdhury
(74) *Attorney, Agent, or Firm* — Sage Patent Group (57) ABSTRACT

The embodiments herein provide a method and apparatus for scheduling users of a communication system, based on an advantageous pre-scheduling scheme. As a first scheduler process during a current scheduling interval, first users selected for scheduling in the current scheduling interval are regularly scheduled to thereby make radio resource reservations for the first users. As a second scheduler process during the current scheduling interval, second users not among the first users are identified as having scheduling deadlines falling in a subsequent scheduling interval. As a further operation of the second scheduler process, the second users for the subsequent scheduling interval are prescheduled to thereby make radio resource reservations in the subsequent scheduling interval for the second users. The second scheduling may be performed using processing resources that would otherwise be left idle by the first scheduler process during the current scheduling interval.

21 Claims, 7 Drawing Sheets

(56) References Cited

U.S. PATENT DOCUMENTS

2011/0185364 A1* 7/2011 Fernandes ............. G06F 9/5083
718/104
2012/0213142 A1* 8/2012 Van Lieshout ..... H04W 72/121
370/312
2016/0095135 A1* 3/2016 Lv ........................ H04W 72/12
370/336

FOREIGN PATENT DOCUMENTS

EP           2654359 A2    10/2013
WO    WO-2012139664 A1 *  10/2012  ........ H04W 72/1247
WO        2014084767 A1     6/2014

* cited by examiner

PREDICTIVE DOWNLINK SCHEDULING

TECHNICAL FIELD

This disclosure generally relates to communication networks, and particularly relates to scheduling radio resources for users of a communication network.

BACKGROUND

The downlink scheduler is one of the key elements of a base station. Its main task is to assign radio resources to a pool of users. Radio resources may include spectrum, channel, coding and timing allocations for user communications.

Downlink scheduling is a sequential process that involves a sequence of steps. Downlink scheduling for Long Term Evolution (LTE) networks could for example comprise the following five steps: user weight calculation, user candidate selection, common control radio resource allocation, (e.g. physical downlink control channel (PDCCH) allocation in the case of LTE networks), multi-cell coordination and scheduling/link adaptation. These steps are performed in a scheduling interval, such as a transmission time interval (TTI).

A multi-core based processor is a processor to which two or more processor cores have been attached for enhanced performance, reduced power consumption, and more efficient simultaneous processing of multiple tasks. Due to the sequential nature of the downlink scheduling process and to the different requirements in terms of processing resources (e.g. digital signal processors (DSPs)), of each one of the steps, parallel operation on a downlink scheduler is not easily implemented to fully benefit from a multi-core architecture. Some processing resources (e.g. DSP cores) may be idle. In particular, for multiple users, the weight calculation step (or task) can be easily distributed in parallel to all available processing resources, as this step is performed on a per user basis (one processing resource can perform the step for one or more users, so all available resources can be used). However, subsequent steps in the process, such as candidate selection, PDCCH and scheduling/link adaptation are performed on a per cell basis. Thus, it is recognized herein, that if the number of cells is less than the number of available DSPs, there may be multiple idle DSPs during one scheduling interval. Furthermore, the multi-cell coordination step uses only one or a limited number of DSPs, possibly leaving the vast majority of DSPs idle. Also, signal timing variation is likely to create idle DSPs. For example, the PDCCH scheduling step will be delayed if a request signal from uplink required for the PDCCH scheduling step is late. It is recognized herein, that due to the sequential nature of the five downlink scheduling steps and the per cell use of processing resources by some steps, there will be a number of idle DSPs, indicating an inefficient use of processing resources, which can limit capacity, e.g., the number of users to which radio resources can be assigned at a time.

SUMMARY

The embodiments herein provide a method and apparatus for scheduling users of a communication system, based on an advantageous pre-scheduling scheme. According to the scheme, during any given current scheduling interval, regular scheduling decisions are made for the current interval and further scheduling decisions are made in advance for a subsequent scheduling interval, e.g., for the next scheduling interval. Among its several non-limiting advantages, performing the pre-scheduling operations during the current interval provides for greater processing efficiency than would be achieved if scheduling decisions were limited to the current interval. Further, by keeping track of users or signaling having scheduling deadlines falling within the subsequent scheduling interval, pre-scheduling those users or signals during the current scheduling interval ensures that they are timely scheduled. Regular scheduling in the subsequent interval integrates or otherwise honors any pre-scheduled decisions previously made for the subsequent interval.

According to some embodiments, a method of scheduling radio resources for users of a communication network includes, during a current scheduling interval, performing, as a first scheduler process, first scheduling of one or more first users selected for scheduling in the current scheduling interval to thereby make radio resource reservations for the first users. The method also includes selecting, as a second scheduler process during the current scheduling interval, one or more second users identified as having scheduling deadlines falling in a subsequent scheduling interval and that are not among the first users. The method further includes performing, as a further operation of the second scheduler process during the current scheduling interval, second scheduling of the second users for the subsequent scheduling interval to thereby make radio resource reservations in the subsequent scheduling interval for the second users.

According to some embodiments, a network node is configured to schedule radio resources for users of a communication network and includes a processing circuit. The processing circuit is configured to perform, as a first scheduler process during a current scheduling interval, first scheduling of one or more first users selected for scheduling in the current scheduling interval to thereby make radio resource reservations for the first users. The processing circuit is also configured to select, as a second scheduler process during the current scheduling interval, one or more second users identified as having scheduling deadlines falling in a subsequent scheduling interval and that are not among the first users. The processing circuit is further configured to perform, as a further operation of the second scheduler process during the current scheduling interval, second scheduling of the second users for the subsequent scheduling interval to thereby make radio resource reservations in the subsequent scheduling interval for the second users.

According to some embodiments, a non-transitory computer readable storage medium stores a computer program comprising program instructions that, when executed on at least one processing circuit of a network node, configure the network node for scheduling radio resources for users of a communication network. The processing circuit is configured to perform, as a first scheduler process during a current scheduling interval, first scheduling of one or more first users selected for scheduling in the current scheduling interval to thereby make radio resource reservations for the first users. The processing circuit is also configured to select, as a second scheduler process during the current scheduling interval, one or more second users identified as having scheduling deadlines falling in a subsequent scheduling interval and that are not among the first users. The processing circuit is configured to perform, as a further operation of the second scheduler process, second scheduling of the second users for the subsequent scheduling interval to thereby make radio resource reservations in the subsequent scheduling interval for the second users.

According to some embodiments, a network node is configured to schedule radio resources for users of a communication network and includes a first scheduling module, a selecting module and a second scheduling module. The first scheduling module is configured to perform, as a first scheduler process during a current scheduling interval, first scheduling of one or more first users selected for scheduling in the current scheduling interval to thereby make radio resource reservations for the first users. The selecting module is configured to select, as a second scheduler process during the current scheduling interval, one or more second users identified as having scheduling deadlines falling in a subsequent scheduling interval and that are not among the first users. The second scheduling module is configured to perform, as a further operation of the second scheduler process during the current scheduling interval, second scheduling of the second users for the subsequent scheduling interval to thereby make radio resource reservations in the subsequent scheduling interval for the second users.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
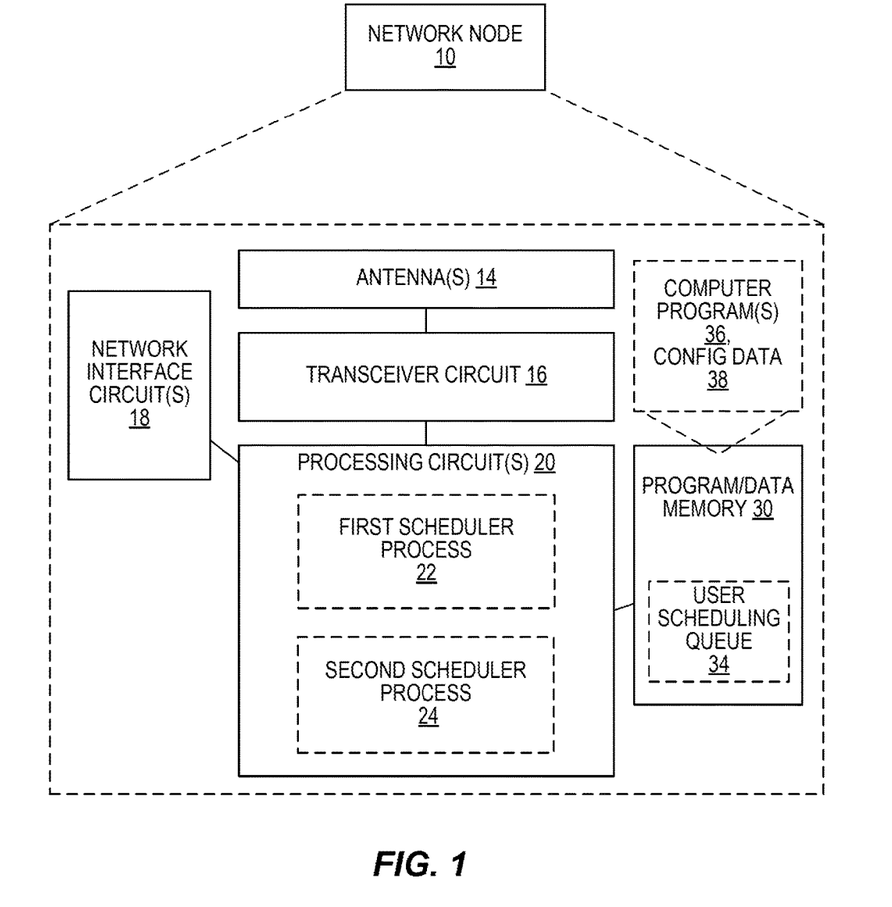
FIG. 1 is a block diagram of a network node configured to schedule radio resources for users of a communication network, according to some embodiments.

FIG. 1 illustrates a diagram of a network node 10, according to some embodiments. The network node 10 provides an air interface to wireless devices, e.g., an LTE air interface for downlink transmission and uplink reception, which is implemented via a radio transceiver circuit 16, which is associated with one or more antennas 14. The transceiver circuit 16 may include transmitter circuits, receiver circuits, and associated control circuits that are collectively configured to transmit and receive signals according to a radio access technology (RAT), for the purposes of providing cellular communication services. According to various embodiments, cellular communication services may be operated according to any one or more of the IEEE16m (i.e., WiMax) or $3^{rd}$ Generation Partnership Project (3GPP) cellular standards, Global System for Mobile communications (GSM), General Packet Radio Service (GPRS), Wideband Code Division Multiple Access (WCDMA), High-Speed Downlink Packet Access (HS-DPA), LTE and LTE-Advanced, and future standards. The network node 10 may also include network interface circuits 18 for communicating with nodes in a core network, other peer radio nodes, and/or other types of nodes in the network. The network node 10 may be, for example, a radio base station such as an eNodeB.

The network node 10 also includes one or more processing circuits 20 that are operatively associated with the transceiver circuit 16. For ease of discussion, the one or more processing circuits 20 are referred to hereafter as "the processing circuit 20". The processing circuit 20 comprises one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 20 may comprise fixed circuitry or programmable circuitry that is specially adapted via the execution of program instructions implementing the functionality taught herein, or may comprise some mix of fixed and programmed circuitry.

The processing circuit 20 in one or more embodiments comprises a multi-core based processing circuit having two or more processor cores utilized for enhanced performance, reduced power consumption, and more efficient simultaneous processing of multiple tasks. Different ones of the processing cores, or different subsets of the processing cores may be allocated to different processing jobs, tasks, or threads. Moreover, as is understood in the digital processing arts, various processing jobs may be performed in parallel in different processing cores, and processing results, whether final or intermediate, may be shared among the cores.

The processing circuit 20 is also associated with memory 30. The memory 30, in some embodiments, stores one or more computer programs 36 and, optionally, configuration data 38. The memory 30 may also store working data for dynamic, ongoing processing operations, such as data representing users selected or ordered for scheduling, such as a user scheduling queue 34. The memory 30 provides non-transitory storage for the computer program 36 and it may comprise one or more types of computer-readable media. For example, the memory 30 may comprise a mix of volatile, working memory devices or circuits, such as static random-access memory (SRAM) and/or dynamic random-access memory (DRAM), along with non-volatile memory, such as disk storage, solid-state memory storage, or any mix thereof. By way of non-limiting example, the memory 30 comprises any one or more of SRAM, DRAM, Electrically Erasable Programmable Read-Only Memory (EEPROM), and FLASH memory. In the case of a multi-core processing circuit implementation of the processing circuit 20, at least a portion of the memory 30 may be made available for sharing by the multiple processing cores.

In general, the memory 30 comprises one or more types of computer-readable storage media providing non-transitory storage of the computer program and any configuration data used by the network node 10. Here, "non-transitory" means permanent, semi-permanent, or at least temporarily persistent storage and encompasses both long-term storage in non-volatile memory and storage in working memory, e.g., for program execution.

However implemented, the network node 10 is configured to perform user scheduling, whereby it makes dynamic allocations of radio resources to individual users. Scheduling may be performed on a defined scheduling interval basis, where scheduling decisions are made in each scheduling interval in an ongoing series of scheduling intervals.

According to the teachings herein, the processing circuit 20 is configured to perform a type of "pre-scheduling," where, in a given current scheduling interval, the processing circuit 20 makes one or more regular scheduling decisions applicable to the current scheduling interval and further makes one or more scheduling decisions applicable to a subsequent scheduling interval, e.g., the next scheduling interval. While it may be that these pre-scheduling decisions depend in some sense on the regular scheduling decisions made in the current interval and/or on prior pre-scheduling decisions that are applicable to the current interval, at least some of the pre-scheduling processing can be done in parallel with the regular scheduling. While not limiting the scope of the teachings herein, it will be appreciated that the pre-scheduling taught herein provides numerous advantages, such as the opportunity to better utilize the processing resources available for scheduling, and to improve communications quality or reliability by using pre-scheduling to address critical transmission time deadlines.

In an example embodiment, the processing circuit 20 is configured to carry out first scheduling operations, which for purposes of discussion may be regarded as "regular scheduling," and to carry out second scheduling operations, which for purposes of discussion may be regarded as the aforementioned "pre-scheduling". Correspondingly, in the example of FIG. 1, one sees that the processing circuit 20 implements first and second scheduler processes 22 and 24.

In any given "current" scheduling interval, e.g., in a current Transmission Time Interval or TTI, the processing circuit 20 is configured to perform, as the first scheduler process 22, first scheduling of one or more first users selected for scheduling in the current scheduling interval, to thereby make radio resource reservations for the one or more first users. Further for the current scheduling interval, the processing circuit 20 is configured to select, as the second scheduler process 24, one or more second users identified as having scheduling deadlines falling in a subsequent scheduling interval and that are not among the one or more first users. The processing circuit 20 is configured to perform, as a further operation of the second scheduler process 24, second scheduling of the one or more second users for the subsequent scheduling interval, to thereby make radio resource reservations in the subsequent scheduling interval, for the one or more second users. As such, these second users may be regarded as being "pre-scheduled" with respect to the subsequent scheduling interval.

With respect to the above scheduling operations, the term "user" encompasses devices or nodes being scheduled for use of the radio resources, and also encompasses other "consumers" of radio resources. For example, certain transmissions must be made at specific times, or according to specified periodicities. These transmissions, such as broadcast channel transmissions, are, for purposes of the above-described scheduling, also considered as "users". Thus, in one example, the pool of users eligible for selection as the "second users" includes one or more devices or nodes, such as User Equipments associated with network subscribers. Additionally, or alternatively, the pool of users eligible for selection as the "second users" includes transmit signals having defined transmission deadlines, such as broadcast channel transmissions. Also, it should be noted that devices or nodes, such as User Equipments belonging to subscribers of the network, may be associated with human subscribers and/or with Machine Type Communications, MTC, devices or nodes as used in Machine-to-Machine communication applications.

As a general proposition, scheduling is an ongoing process in which scheduling decisions are made in each successive scheduling interval, which may be a window of time as defined by the air interface protocols in use, e.g., a TTI. Scheduling generally involves the allocation of limited communication resources to particular users from a pool of users competing for the same resources. Moreover, to the extent that the network comprises defined service areas or cells, scheduling may be performed on a per-area or per-cell basis, although scheduling also may be joint or interdependent across service areas or cells, such as done to limit inter-cell interference. It is recognized herein that, because of the sequential properties of conventional scheduling, some processing resources or DSPs will be idle.

Thus, for a given set of users subject to scheduling with respect to a given set of resources, the teachings herein contemplate performing first and second scheduler processes. The first scheduler process 22 performs scheduling of certain users with respect to each current scheduling interval. Within a given current scheduling interval, the second scheduler process 24 "pre-schedules" certain other users with respect to a subsequent scheduling interval. This pre-scheduling can run in parallel, at least partly, with the regular scheduling being done by the first scheduler process 22. Further, the pre-scheduling undertaken by the second scheduler process 24 in the given scheduling interval can bridge into the next scheduling interval.

Among the several non-limiting advantages previously noted for the contemplated prescheduling, the second scheduler process 24 can ensure that those users not scheduled in the current interval but having time-critical scheduling deadlines falling within the subsequent interval can be scheduled ahead of time, with respect to the subsequent scheduling interval. Such processing helps meet Quality-of-Service, QoS, requirements and in general enhances the user experience. Further, to the extent that the first scheduler process 22 in the current interval leaves spare and otherwise unused processing resources available, the second scheduler process 24 can advantageously use those spare resources, thus increasing overall processing efficiency. Still further, by exploiting otherwise unused processing resources in any given current scheduling interval for pre-scheduling, the net effect is that more users may be scheduled over a given number of scheduling intervals than would have been scheduled using just regular scheduling.

Figure 2:
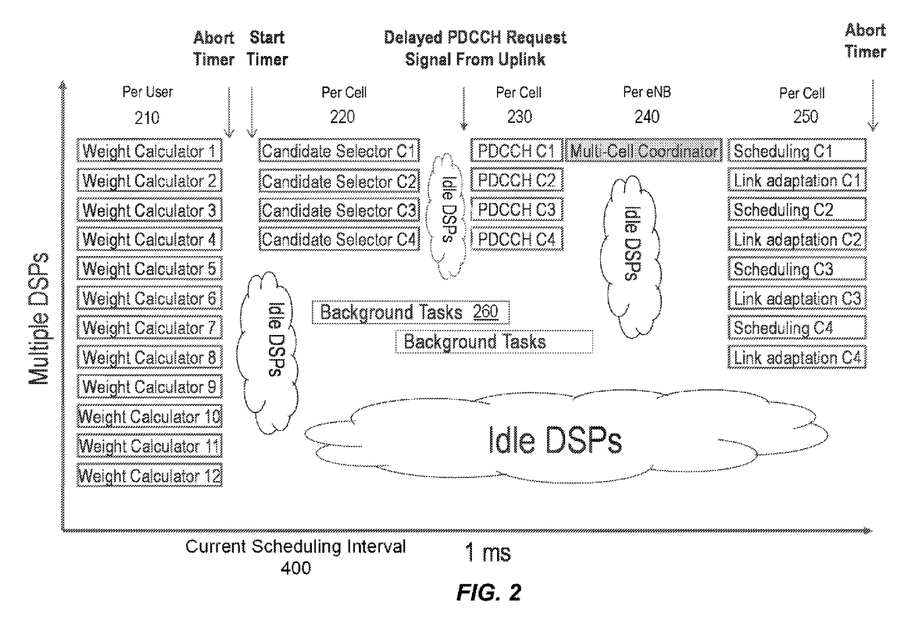
FIG. 2 is a diagram of processing resource utilization, e.g., processor core utilization in a multi-core processing circuit, of a first scheduler process during a scheduling interval.
Figure 3:
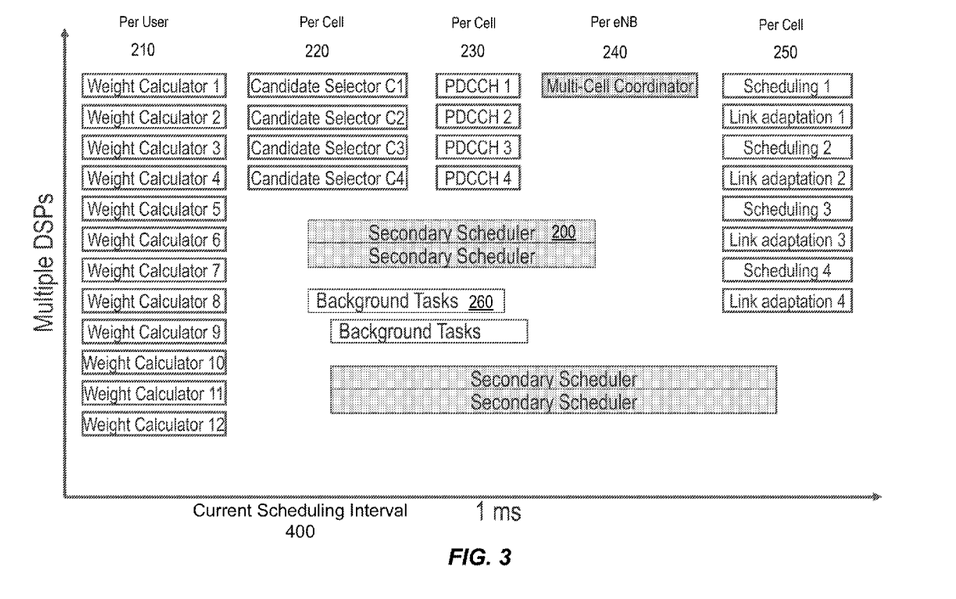
FIG. 3 is a diagram of one embodiment of processing resource utilization using pre-scheduling as taught herein.
Figure 4:
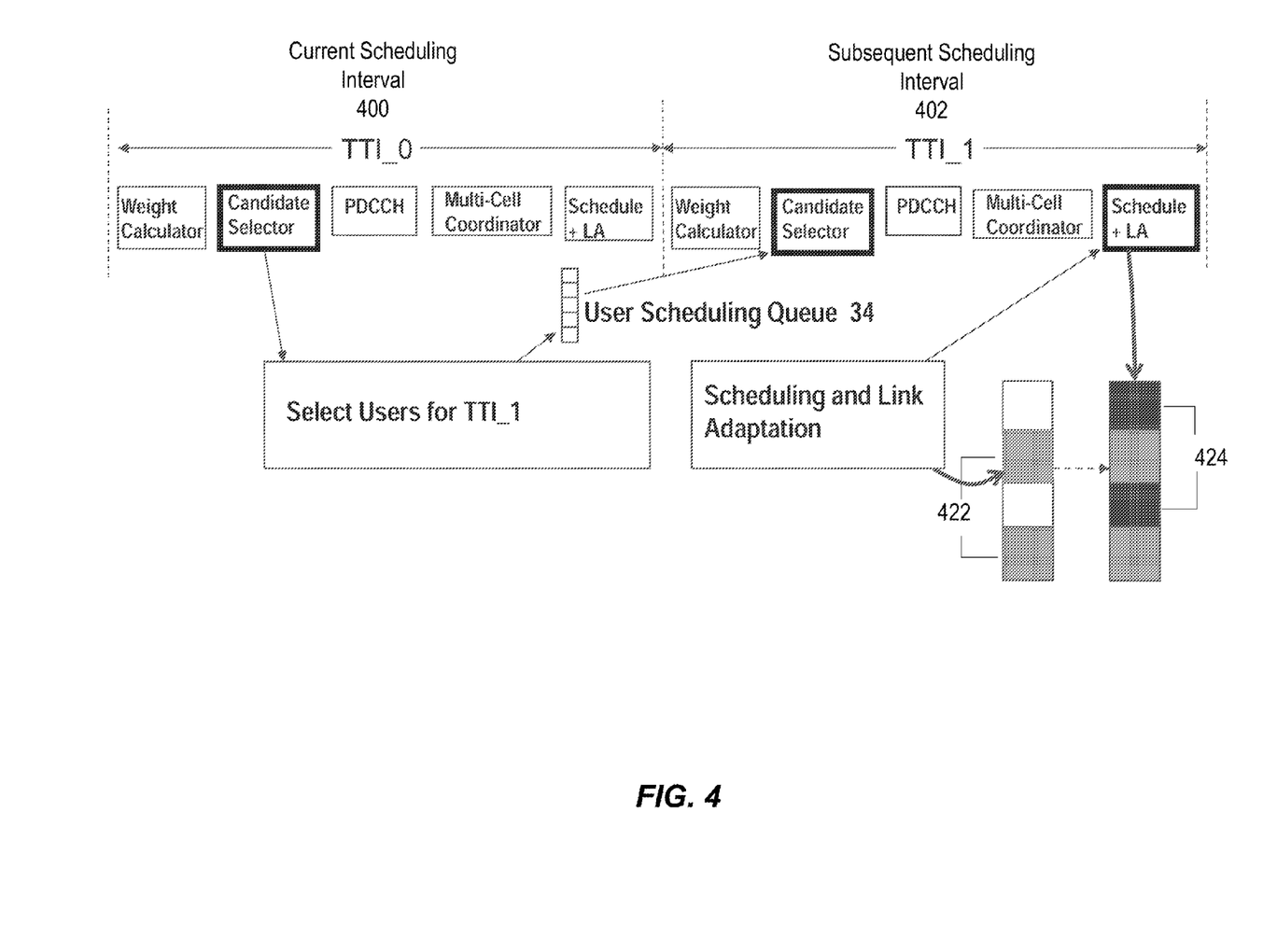
FIG. 4 is a diagram of first and second scheduler process operations according to an example embodiment, for a current scheduling interval and a subsequent scheduling interval.

In a more detailed example implementation, assume that given users in one or more cells are subject to ongoing scheduling via the first and second scheduler processes 22 and 24. FIGS. 3 and 4 will be used to describe this example implementation. But first, FIG. 2 illustrates, in more detail, downlink scheduling by the first scheduler process 22. Downlink scheduling by the first scheduler process 22 can be summarized into a number of steps. In a first step 210 of the current scheduling interval 400, weight calculators calculate a weight for each user based on factors, such as its QoS requirements, nature of the service provided to them, hybrid automatic repeat request (HARQ) result, etc. For example, such users may be involved in a phone call utilizing delay based scheduling for Voice Over IP (VoIP). In such a case, users must be scheduled by a certain scheduling interval or within a certain number of scheduling intervals. This scheduling deadline must be met in the determined scheduling interval to ensure that actual transmission occurs within the QoS imposed delay limits. If the scheduling deadline is not met, the extra delay might be detected in the phone call and affect the quality of the user experience. In some cases, information about the scheduling deadlines of users may be obtained as part of the scheduling before or during the current scheduling interval.

As previously explained, the term "user" encompasses other essentially any consumer of radio resources, including subscriber devices and/or broadcast channel transmissions. Here, it may be helpful to note that at least some broadcast channels may need to be scheduled according to periodic transmission times. For example, the scheduling deadline for a broadcast channel may fall within a predetermined time period, interval or a specified number of scheduling intervals. Accordingly, scheduling priority weights for broadcast channel transmissions may be calculated and considered along with other user weights.

The weight calculations are performed per user such that an allocable processing core in a multi-core processor implementation of the processing circuit 20 may be utilized for each user weight calculation. In the diagram, the individual boxes denote individual "DSPs" or digital signal processors as the multiple processing cores at issue.

In a second step 220, a list of users is selected per cell, for scheduling. This selection is based on respective weights determined for the users. A different DSP may be utilized for the processing associated with each cell.

In a third step 230, each selected user is assigned channel resources, e.g., assigned a Physical Downlink Control Channel or PDCCH, for the user's respective cell. Note, here, that uplink scheduling also consumes control channel resources, so PDCCH allocation must also consider the control-channel resources being allocated by the uplink scheduler, which is not explicitly shown here. The PDCCH step 230 is performed on a per cell basis, a different DSP performing the step for a respective cell.

In a fourth step 240, a multi-cell coordinator applies a resource pooling solution to distribute the available resources among cells based on various conditions. The multi-cell coordination 240 is performed per radio node, such as per base station or eNodeB. As a result, this step often involves very few DSPs. In a fifth step 250, the specific scheduling and link adaptation is actually applied to the selected users on a per cell basis. Note that additional processing may be allocated during this time to perform certain non-time critical background tasks 260.

Increasing the overall number of users scheduled over a given window of time represents an optimization goal for scheduling, while also meeting QoS constraints, etc. Continuing the example implementation, FIG. 3 helps visualize how the secondary scheduler process 24 provides more optimal scheduling, by depicting the operations of the secondary scheduler process 24 conceptually as a "secondary scheduler 200" that, within a given current scheduling interval 400, utilizes a processing resource, such as a DSP, not used by the first scheduler process 22. For example, the secondary scheduler 200 in FIG. 3 illustrates a time period during the current scheduling interval 400 for when one or more DSPs are utilized by the secondary scheduler process 24. In this example, the secondary scheduler 200 represents the secondary processing resource 24 performing steps 220-240. The secondary scheduler 200 may also use other processing resources to carry out steps 220-250, such as for other users, during the current scheduling interval 400. The step or combination of steps performed by the secondary scheduler 200 with one or more processing resources is not limited to those shown in FIG. 3. In some cases, only step 220 is performed, using one processing resource or multiple processing resources. In other cases, a combination of steps not shown in FIG. 3 is performed by the secondary scheduler 200.

FIG. 4 shows operations of the first scheduler process 22 and the second scheduler process 24 during a current scheduling interval 400 and a subsequent scheduling interval 402. While FIG. 4 depicts the subsequent scheduling interval as being the immediately next scheduling interval, in at least one embodiment herein, the subsequent scheduling interval 402 for which pre-scheduling is performed is not necessarily the very next scheduling interval. In any case, during the current scheduling interval 400, the secondary scheduler process 24 selects users that must be scheduled in the subsequent scheduling interval 402. As noted, the subsequent scheduling interval 402 may be the next scheduling interval or a later scheduling interval after the next scheduling interval.

As stated earlier, many processing resources may normally be left idle by conventional downlink schedulers, particularly during the PDCCH 230 and multi-cell coordinator 240 steps. Continuing the embodiment, the second scheduler process 24 makes use of otherwise idle processing resources of the current scheduling interval 400 to select a second set of users for scheduling radio resources in a subsequent scheduling interval 402. This second set of users is not selected from among the first set of users selected by the first scheduler process 22. The selection by the second scheduler process 24 may start immediately upon or after the first scheduler process 22 has made its selection of the first set of users. In some cases, the selection by the second scheduler process 24 may start before the PDCCH step 230.

Figure 5:
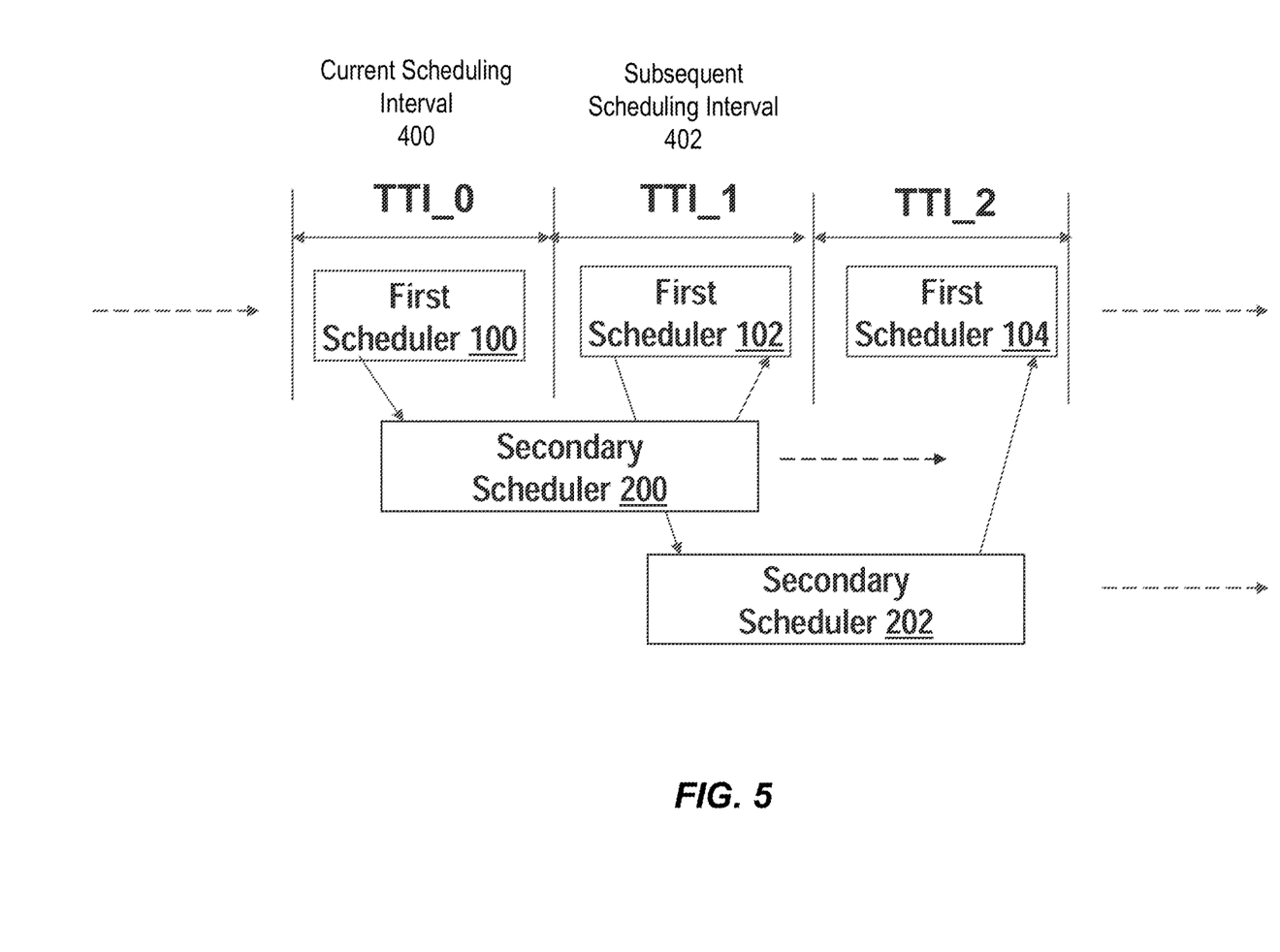
FIG. 5 is a diagram of a first scheduler pipelined with a secondary scheduler, according to some embodiments.

To illustrate another aspect, FIG. 4 will be explained with help from FIG. 5. FIG. 5 is used to conceptually illustrate the first scheduler process 22 and the second scheduler process 24 in a series of scheduling intervals. For example, the operation of the first scheduler process 22 during the current scheduling interval 400 is conceptually represented by first scheduler 100. The operation of the second scheduler process 24 in the current scheduling interval 400 is shown as secondary scheduler 200. The first scheduler process 22 of the subsequent scheduling interval 402 is shown as first scheduler 102. Likewise, first scheduler 104 represents the first scheduler process 22 for a scheduling interval following the subsequent scheduling interval 402. Secondary scheduler 202 represents the secondary scheduler process 24 instantiated in the subsequent scheduling interval 402.

As shown in the example diagram of FIG. 4, information for the prescheduled ("second") users selected for the subsequent scheduling interval 402 are stored in a user scheduling queue 34. This information identifies these prescheduled users and any scheduling decisions saved for the prescheduled users with respect to a subsequent scheduling interval 402, such as radio resource reservations 422. Accordingly, these scheduling decisions—i.e., the pre-scheduling decisions—made by the secondary scheduler 200 during the current scheduling interval 400 will be honored by the first scheduler 102 during that subsequent scheduling interval 402. For example, when the subsequent scheduling interval 402 becomes the current scheduling interval for purposes of regular scheduling new ("first") users by the first scheduler 102, the first scheduler 102 identifies the list of users that were prescheduled for the now-current scheduling interval and deducts these prescheduled users from any users to be newly selected by the first scheduler 102. First scheduler 102 also honors the resource reservations 422 made for the prescheduled users. That is, the first scheduler 102 makes radio resource reservations 424 for newly selected users around radio resource reservations 422 for the prescheduled users. As such, the first scheduler 102 of the subsequent scheduling interval 402 may schedule a fewer number of new users than it would have, absent the preexisting resource reservations 422 already made by the secondary scheduler 200 in the corresponding prior scheduling interval 400.

Scheduling and link adaptation may be performed on a candidate list in the user scheduling queue 34 by the secondary scheduler 200, according to some embodiments. The scheduling decisions can be saved in the user scheduling queue 34 and combined with the result from the first scheduler 102 of a subsequent scheduling interval 402. The scheduled resources by the secondary scheduler 200 will be reserved and deducted by the first scheduler 102 from scheduling new users.

According to some embodiments, for all users, including those represented in the user scheduling queue 34, several processes, including common control radio resource allocation, are performed by the first scheduler 100 and the first scheduler 102. Common control radio resource allocation may include PDCCH allocation. In such cases, user scheduling queue 34 is needed because the PDCCH allocation at the first scheduler 102 during the subsequent scheduling interval 402 includes making PDCCH allocations for the users prescheduled by the secondary scheduler 200.

In some cases, as shown in FIG. 5, the secondary scheduler 200 may begin during the current scheduling interval 400 and either stop at the end of the current scheduling interval 400, or continue into the next scheduling interval 402 or even a later scheduling interval such that it operates in parallel with the first scheduler 100 and the first scheduler 102. Likewise, another secondary scheduler 202 may start in the subsequent scheduling interval 402 and continue into the following scheduling interval such that it operates in parallel with the first scheduler 104 and even in parallel with the secondary scheduler 200. According to some embodiments, one or more first schedulers are pipelined with one or more secondary schedulers. The term 'pipelined' is used herein to describe that actions of the secondary scheduler 200 are interleaved with those of a first scheduler 100. For example, the first scheduler 100 performs a task, the second scheduler 200 takes over and the result from the second scheduler 200 is fed-back to the first scheduler 100 or another first scheduler 102.

The processing circuit 20 may be configured to coordinate the first scheduler 100, 102 and 104 with the secondary schedulers 200, 202 in order to ensure that the users meet their scheduling deadlines and/or latency requirements. For example, if a VoIP user misses the scheduling in the current scheduling interval 400 and the scheduling deadline is in a subsequent scheduling interval 402, such as the next scheduling interval, the user has to be scheduled in the next scheduling interval to avoid missing the latency deadline. For broadcast channels, the scheduling deadline is predetermined, i.e., it has to be scheduled on a certain scheduling interval. It is thus possible to predict the scheduling deadline for such users. In some cases, scheduling deadlines of the second users are obtained or determined prior to the selecting of the second users. Note that the first schedulers 100, 102 and the second schedulers 200, 202 are used to explain the scheduling operations with respect to different scheduling intervals and that the first and second scheduler processes 22, 24 can be regarded as running on an ongoing basis across and within the succeeding intervals.

The processing circuit 20 in some embodiments includes or comprises a multi-core processing circuit having a plurality of processing cores. For any given scheduling interval or intervals, the processing circuit 20 is configured to allocate a first set of the plurality of processing cores for the first scheduler process 22 and allocate a second set of the plurality of processing cores for the second scheduler process 24, the second set being disjoint from the first set. The second set is allocated from spare ones of the plurality of processing cores not in current use by the first scheduler process 22. The second set of cores includes a number of spare ones of the plurality of processing cores allocated depending on a total number of spare ones of the plurality of processing cores meeting an availability threshold. This availability threshold may be a number of cores that must be set aside based on historical, current, predicted and/or future processes such that a sufficient number of processing cores are available to the first scheduler process 22 when needed.

This approach treats the first scheduler process 22 as the primary process and the secondary scheduler process 24 as a supplemental process or an as needed or as permitted operation. As such, the number of processor cores allocated to the first scheduler process 22 may vary dynamically, e.g., on current loading, such as in dependence on the number of cells being scheduled and the overall number of users in the pool for scheduling. In at least one embodiment, the second scheduler process 24 dynamically varies its complexity— e.g., varies the number of users for which it makes secondary scheduling decisions in the given current interval—in dependence on the number of processing cores available to it. In extreme cases, the second scheduler process 24 may not run at all in a given scheduling interval—i.e., it may suspend its scheduling operations to preserve processing cores for the first scheduler process 22, or for other reasons.

In at least one embodiment, the number of processing cores allocated for the second scheduler process 24 is based on upcoming processing resource requirements of the first scheduler process 22 during the current scheduling interval 400 such that there are spares ones of the plurality of processing cores available to the first scheduler process 22 when required by the first scheduler process 22.

In turn, in at least some embodiments, the processing circuit 20 is configured to perform the first scheduler process 22 and second scheduler process 24 operations described herein at least in part based on its execution of computer program instructions comprising the computer program 36. As noted, some portion of the memory 30 also may advantageously store the user scheduling queue 34.

Figure 6:
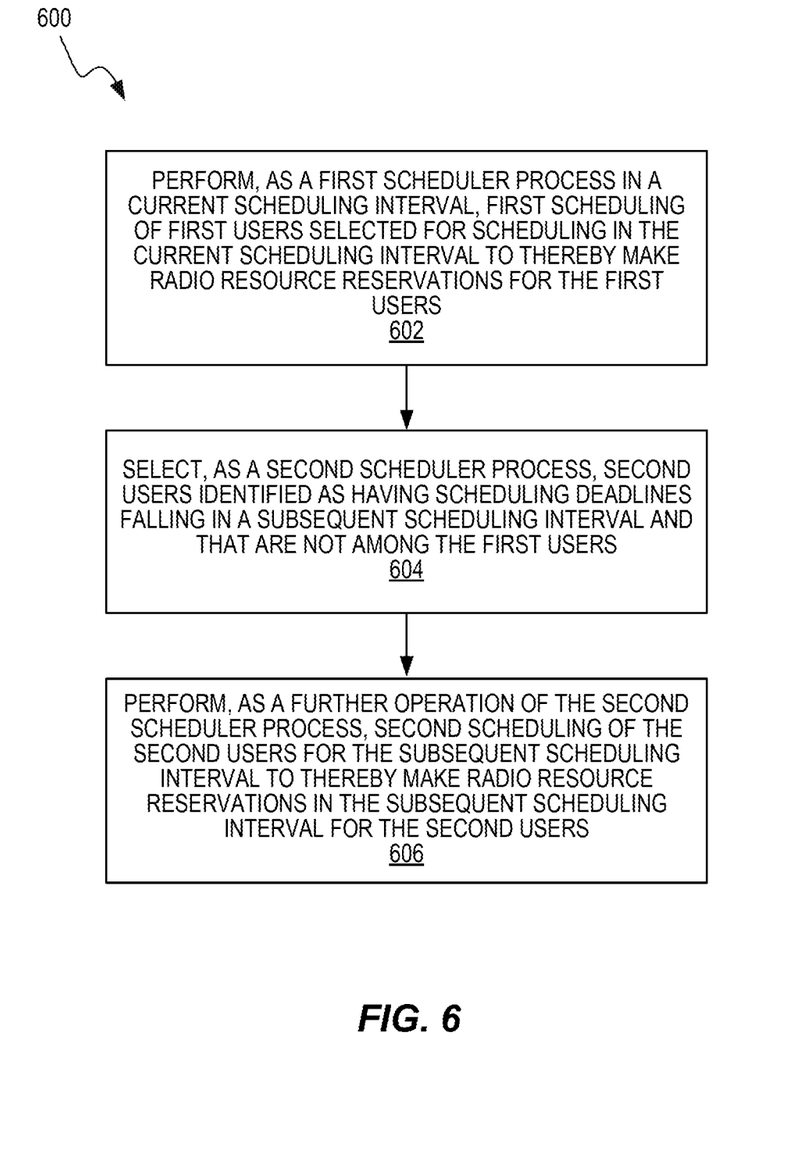
FIG. 6 is a flowchart illustrating a method of scheduling radio resources for users of a communication network, according to some embodiments.

Regardless of its specific implementation details, the processing circuit 20 of network node 10 is configured to perform a method, such as method 600 of FIG. 6, for scheduling radio resources for users of a communication network. To that end, the processing circuit 20 is configured to perform the method 600, including performing, as a first scheduler process 22, first scheduling of one or more first users selected for scheduling in the current scheduling interval 400 to thereby make radio resource reservations for the one or more first users (block 602 of FIG. 6). Blocks 602-606 may all be performed, or at least started, during the current scheduling interval 400. The first scheduling may involve newly selected users and scheduling radio resources of these new first users, as part of a regular scheduling. Users are newly selected according to one or more selection criteria. The first scheduling may also identify users previously selected by a prior scheduler and newly select users not identified as previously selected. The information for previously selected users may be stored in operating memory or in a data structure such as user scheduling queue 34. This may include information about the radio resource reservations for the previously selected users.

The method 600 also includes selecting, as a second scheduler process 24, one or more second users identified as having scheduling deadlines falling in a subsequent scheduling interval 402 and that are not among the first users (block 604). Otherwise idle processing resources are utilized to perform the tasks of the second scheduler process 24. Note that the second scheduler process 24 is a term representative of what can be multiple tasks performed by multiple processing resources or processing cores.

The method 600 further includes performing, as a further operation of the second scheduler process 200, second scheduling of the second users for the subsequent scheduling interval 402 to thereby make radio resource reservations 422 in the subsequent scheduling interval 402 for the second users (block 606). As described above, the selecting 604 and the second scheduling 606 are performed using processing resources, such as available processing cores, that would otherwise be left idle during the current scheduling interval 400. There may be some scheduling intervals where there are few idle resources available during certain steps due to a heavier burden performed by the first scheduler process 22. For example, a larger number of cells than normal may be involved such that selection step 220 and PDCCH 230 leave less idle processing resources for future user selection by second scheduler process 24. However, this may mean that the second scheduler process 24, or the secondary scheduler 200, starts at a later time, such as during multi-cell coordination 240 or while awaiting responses during the PDCCH step 230.

On the other hand, in cases where there are less processing resources used by the first scheduler process 22, the second scheduler process 24 many preschedule more users for a subsequent scheduling interval than on average. In such cases, users with known scheduling deadlines two scheduling intervals ahead may be considered for prescheduling, including preselecting. The processing circuit 20 is configured to optimize the user of the processing resources and adjust the number of processing cores that need to remain available or can be made readily available to the first scheduler process 22. As a result, the operation of the first scheduler process 22 is likely not halted by a second scheduler process 24, unless for some reason the processing circuit 20 finds that the timing of the first scheduler process 22 warrants such action by the second scheduler process 24.

Figure 7:
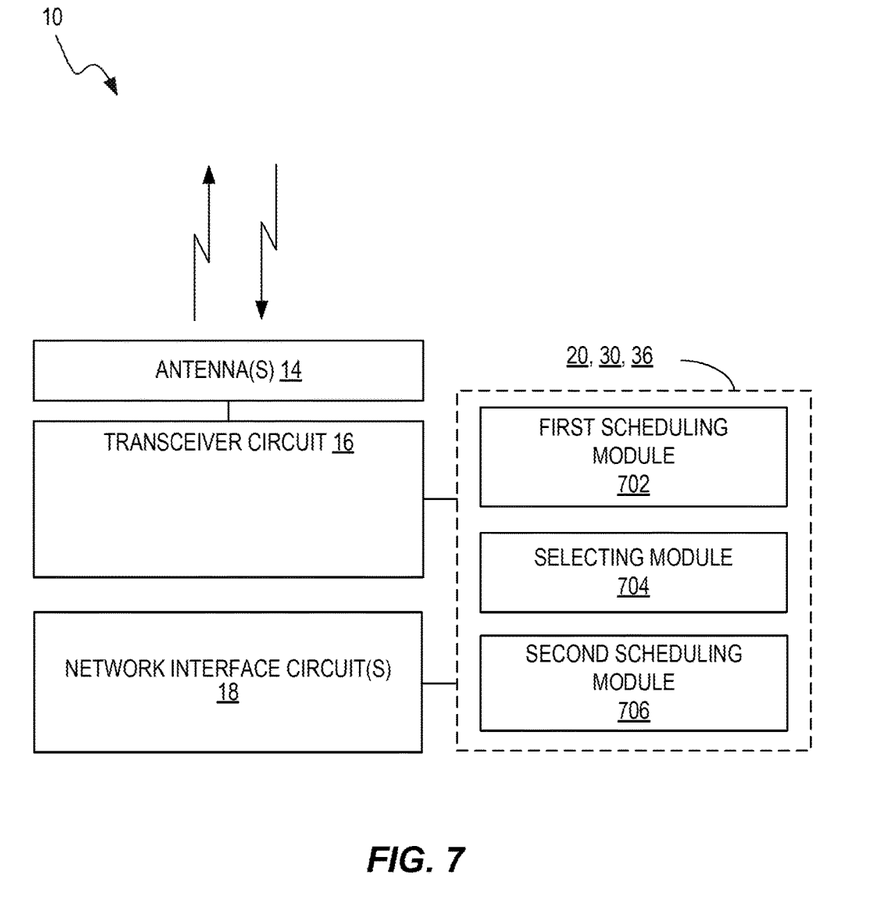
FIG. 7 is a block diagram of a network node configured to schedule radio resources for users of a communication network, according to some embodiments.

FIG. 7 illustrates an example functional module or circuit architecture as may be implemented in the network node 10, e.g., based on the processing circuit 20 executing computer program instructions included in the computer program 36 stored in the storage memory 30. The illustrated embodiment at least functionally includes a first scheduling module 702 for first scheduling of one or more first users selected for scheduling as a first scheduler process 22 in the current scheduling interval 400 to thereby make radio resource reservations for the one or more first users. The embodiment also includes a selecting module 704 for selecting, as a second scheduler process 24, one or more second users identified as having scheduling deadlines falling in a subsequent scheduling interval 402 and that are not among the first users. The embodiment also includes a second scheduling module 706 for performing, as a further operation of the second scheduler process 24, second scheduling of the second users for the subsequent scheduling interval 402 to thereby make radio resource reservations 422 in the subsequent scheduling interval 402 for the second users.

Advantages of the described embodiments allow a secondary scheduler to offload some of the processing burden from the regular first scheduler. This pipeline type approach between the two schedulers can be applied to efficiently use processing resources, such as DSPs or cores. The predictability or known scheduling deadlines of some users may be leveraged for preselecting and prescheduling. Such users may be utilizing VoIP or may be broadcast channels having known transmit time deadlines. The extra processing cycles afforded by the secondary scheduler may also assist the regular first scheduler with reaching better optimal decisions for advanced features such as multiuser Multiple-In-Multiple-Out (MIMO) and Coordinated Multi-Point (CoMP) transmissions. The strategies described above may be applied to both uplink and downlink, and in any baseband product, such as for LTE and WCDMA and any future Radio Access Technology (RAT).

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a network node, of scheduling radio resources for users of a communication network, the method comprising, during a current scheduling interval:
    performing, as a first scheduler process, first scheduling of one or more first users selected for scheduling in the current scheduling interval, to thereby make radio resource reservations in the current scheduling interval for the one or more first users, wherein performing first scheduling of the one or more first users comprises:
        identifying users that were, in a prior scheduling interval, scheduled for the current scheduling interval; and
        regularly scheduling, for the current scheduling interval, newly selected users not among prior scheduled users according to one or more selection criteria while honoring reservations of radio resources in the current scheduling interval for the prior scheduled users;
    selecting, as a second scheduler process, one or more second users identified as having scheduling deadlines falling in a subsequent scheduling interval and that are not among the one or more first users; and
    performing, as a further operation of the second scheduler process, second scheduling of the one or more second users for the subsequent scheduling interval, to thereby make radio resource reservations in the subsequent scheduling interval for the one or more second users.

2. The method of claim 1, wherein the selecting and the second scheduling are performed using processing resources that would otherwise be left idle during the current scheduling interval.

3. The method of claim 2, wherein the processing resources comprise a plurality of processing cores of a multi-core processing circuit, and wherein the method further comprises:
    allocating a first set of the plurality of processing cores for the first scheduler process; and
    allocating a second set of the plurality of processing cores for the second scheduler process, the second set being disjoint from the first set, wherein the second set is allocated from spare ones of the plurality of processing cores not in current use by the first scheduler process.

4. The method of claim 3, wherein allocating the second set comprises allocating a number of spare ones of the plurality of processing cores in dependence on a total number of spare ones of the plurality of processing cores meeting an availability threshold.

5. The method of claim 3, further comprising adjusting a number of the second set of the plurality of processor cores allocated for the second scheduler process based on upcoming processing resource requirements of the first scheduler process during the current scheduling interval such that there are spares ones of the plurality of processing cores available to the first scheduler process when required by the first scheduler process.

6. The method of claim 1, wherein reservations of the radio resources for the scheduled one or more second users are honored by a first scheduler process that performs first scheduling of users in the subsequent scheduling interval.

7. The method of claim 1, further comprising storing information for the scheduled one or more second users in a scheduling queue such that a first scheduler process that performs first scheduling for users in the subsequent scheduling interval performs first scheduling for users identified as not having information in the scheduling queue.

8. The method of claim 1, further comprising starting the second scheduler process after the one or more first users have been selected.

9. The method of claim 1, further comprising determining, by the second scheduler process, the scheduling deadlines of the one or more second users prior to the selecting of the one or more second users.

10. The method of claim 1, wherein the one or more second users are selected from candidate users, including users utilizing delay based scheduling for Voice Over IP (VoIP).

11. The method of claim 1, wherein the one or more second users are selected from candidate users, including broadcast channels having a predefined transmission time.

12. A network node configured to schedule radio resources for users of a communication network, comprising:
a transceiver circuit configured to transmit and receive signals in the communication network; and
a processing circuit configured, during a current scheduling interval, to:
perform, as a first scheduler process, first scheduling of one or more first users selected for scheduling in the current scheduling interval, to thereby make radio resource reservations in the current scheduling interval for the one or more first users, wherein the processing circuit is configured to:
identify users that were, in a prior scheduling interval, scheduled for the current scheduling interval; and
regularly schedule, for the current scheduling interval, newly selected users not among the prior scheduled users according to one or more selection criteria while honoring reservations of radio resources in the current scheduling interval for the prior scheduled users;
select, as a second scheduler process, one or more second users identified as having scheduling deadlines falling in a subsequent scheduling interval and that are not among the one or more first users; and
perform, as a further operation of the second scheduler process, second scheduling of the one or more second users for the subsequent scheduling interval, to thereby make radio resource reservations in the subsequent scheduling interval for the one or more second users.

13. The network node of claim 12, wherein the processing circuit is configured to perform the scheduling using processing resources that would otherwise be left idle during the current scheduling interval.

14. The network node of claim 13, wherein the processing resources comprise a plurality of processing cores of a multi-core processing circuit, and wherein the processing circuit is configured to:
allocate a first set of the plurality of processing cores for the first scheduler process; and
allocate a second set of the plurality of processing cores for the second scheduler process, the second set being disjoint from the first set, wherein the second set is allocated from spare ones of the plurality of processing cores not in current use by the first scheduler process.

15. The network node of claim 14, wherein the processing circuit is configured to allocate a number of spare ones of the plurality of processing cores in dependence on a total number of spare ones of the plurality of processing cores meeting an availability threshold.

16. The network node of claim 14, wherein the processing circuit is configured to adjust a number of the second set of the plurality of processor cores allocated for the second scheduler process based on upcoming processing resource requirements of the first scheduler process during the current scheduling interval such that there are spares ones of the plurality of processing cores available to the first scheduler process when required by the first scheduler process.

17. The network node of claim 12, wherein reservations of the radio resources for the scheduled one or more second users are honored by a first scheduler process that performs first scheduling of users in the subsequent scheduling interval.

18. The network node of claim 12, wherein the processing circuit is configured to store information for the scheduled one or more second users in a scheduling queue such that a first scheduler process that performs first scheduling for users in the subsequent scheduling interval performs first scheduling for users identified as not having information in the scheduling queue.

19. The network node of claim 12, wherein the processing circuit is configured to start the second scheduler process after the one or more first users have been selected.

20. The network node of claim 12, wherein the processing circuit is configured to determine, by the second scheduler process, the scheduling deadlines of the one or more second users prior to the selecting of the one or more second users.

21. A non-transitory computer readable storage medium storing a computer program comprising program instructions that, when executed on at least one processing circuit of a network node, configure the network node for scheduling radio resources for users of a communication network, based on during a current scheduling interval, configuring the at least one processing circuit to:
perform, as a first scheduler process, first scheduling of one or more first users selected for scheduling in the current scheduling interval, to thereby make radio resource reservations in the current scheduling interval for the one or more first users, wherein the processing circuit is configured to:
identify users that were, in a prior scheduling interval, scheduled for the current scheduling interval; and
regularly schedule, for the current scheduling interval, newly selected users not among prior scheduled users according to one or more selection criteria while honoring reservations of radio resources in the current scheduling interval for the prior scheduled users;

select, as a second scheduler process, one or more second users identified as having scheduling deadlines falling in a subsequent scheduling interval and that are not among the one or more first users; and perform, as a further operation of the second scheduler process, second scheduling of the one or more second users for the subsequent scheduling interval to thereby make radio resource reservations in the subsequent scheduling interval for the one or more second users.

* * * * *